Nov. 28, 1944.　　　H. N. SUDDUTH　　　2,363,624
AIR BRAKE
Filed Jan. 1, 1944　　　2 Sheets-Sheet 2
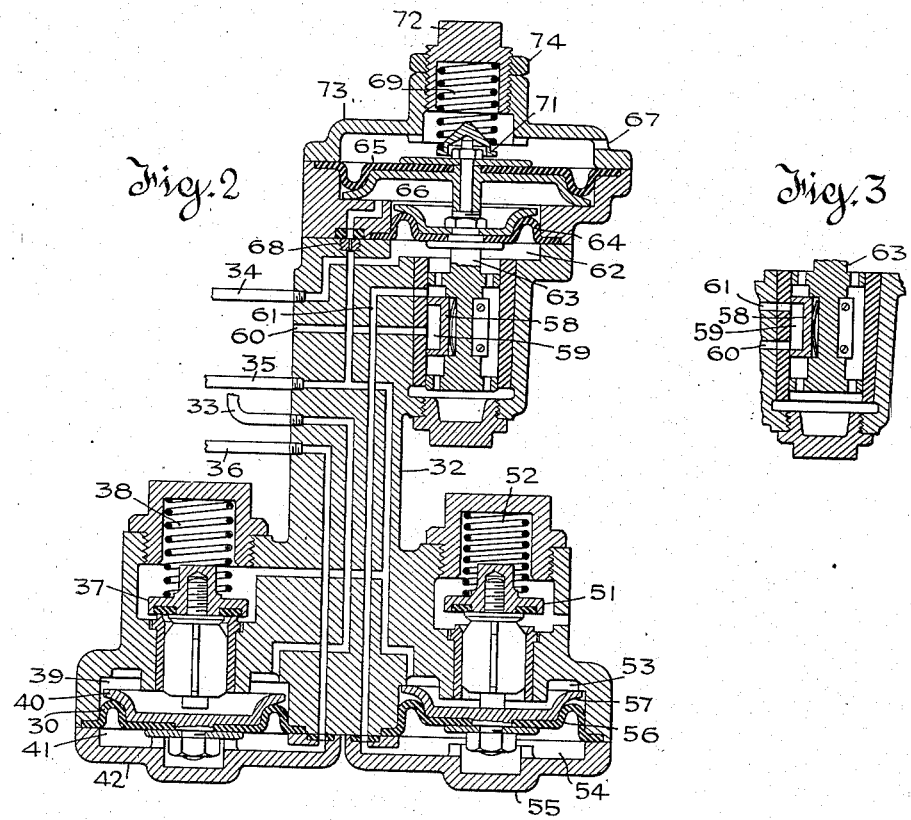
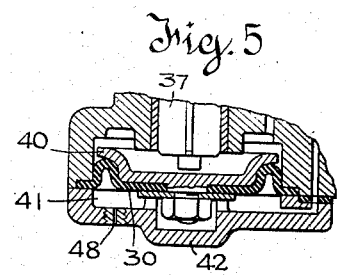
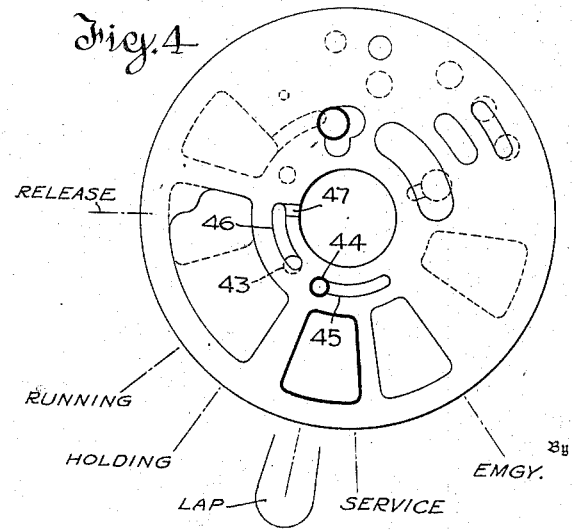
Inventor
Henry Norton Sudduth
Attorneys Patented Nov. 28, 1944

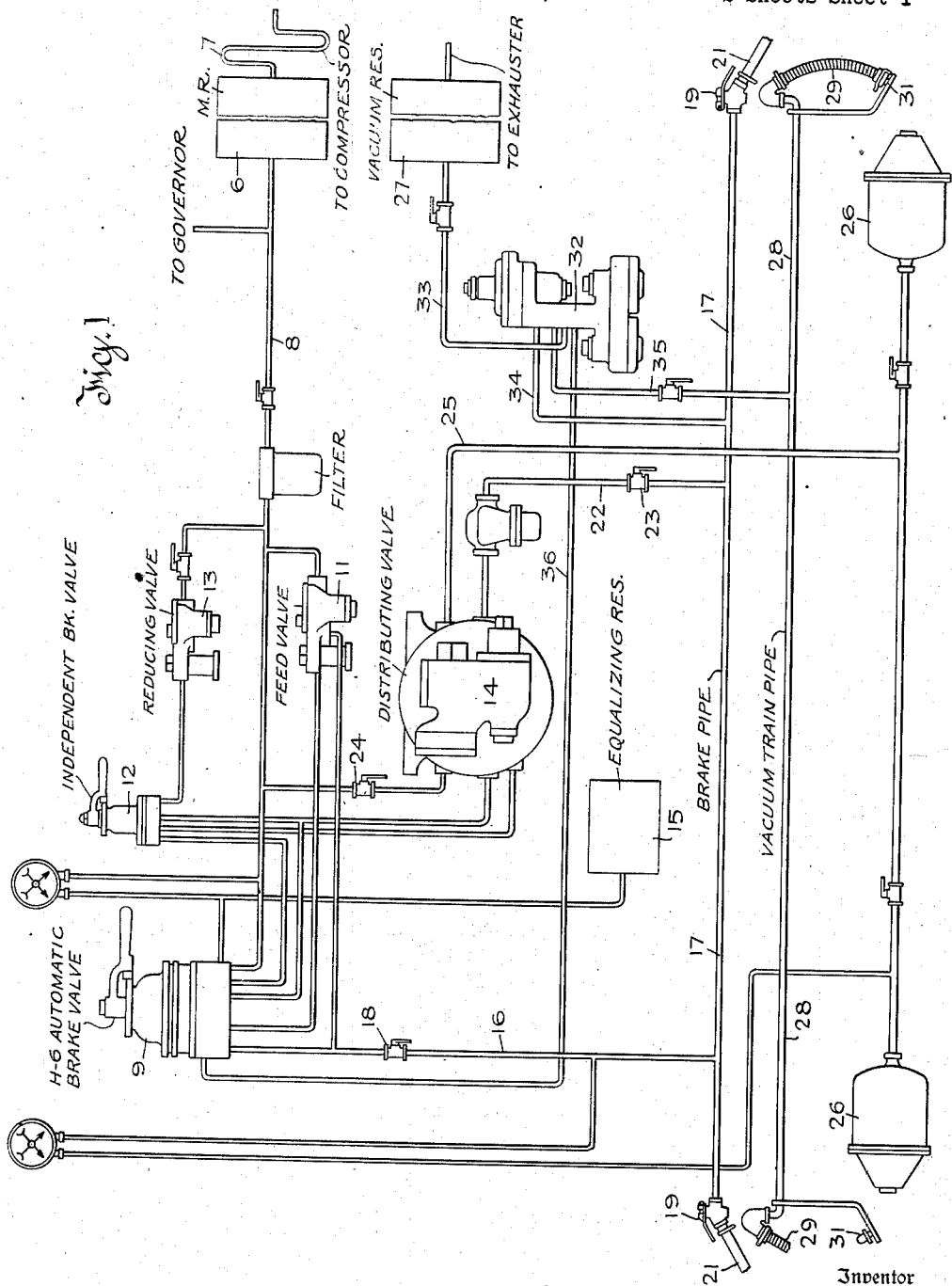

2,363,624

UNITED STATES PATENT OFFICE 2,363,624

AIR BRAKE

Henry Norton Sudduth, Watertown, N. Y., assignor to The New York Air Brake Company, a corporation of New Jersey Application January 1, 1944, Serial No. 516,615

11 Claims. (Cl. 303—4)

This invention relates to dual fluid pressure brake systems, that is, systems capable of applying brakes by the automatic pressure system or automatic vacuum system, or both.

A significant aspect of the invention is the fact that the locomotive equipment is of the conventional pressure type standard on railroads in the United States, and includes an automatic brake valve (such as the H—6) and a conventional independent brake valve. The preferred embodiment involves a slight modification of the automatic valve but this does not change its characteristic manipulation or its normal functions. A modified embodiment of the invention permits the use of a standard engineer's brake valve.

Added to the locomotive equipment in both embodiments and controlled by the automatic brake valve is a vacuum control valve mechanism with vacuum reservoir, exhauster, vacuum train pipe and necessary double heading and cut out cocks. This vacuum control valve comprises a large capacity, diaphragm actuated release valve controlled directly by the automatic brake valve, and a functionally distinct application valve controlled primarily by brake pipe pressure with modifying control effected by resultant changes in vacuum train pipe pressure, so that the vacuum braking effects are coordinated with or follow the pressure braking effects. The application valve is also of the large capacity diaphragm actuated type and is piloted by a coordinating portion affected by pressures in the brake pipe and the vacuum train pipe.

Thus the locomotive brakes operate on the pressure system, with independent brake valve control when desired. Such a locomotive may control a train of cars with automatic pressure brakes or a train with automatic vacuum brakes and if cars have dual train pipes (or some equivalent means of connection) may control a train in which both types of brake equipment are present. In any case the controls effected are harmonius, so that violent slack action will not occur in either application or release of the brakes.

The invention was developed for use with small Diesel electric locomotives intended for use, in places where cars equipped with either type of brake are encountered, and where the engine drivers are familiar with American standards.

A preferred embodiment of the invention is illustrated in the accompanying drawings, in which Figure 1 is a diagram of the locomotive equipment with the invention incorporated.

Figure 2 is a diagrammatic section of the application and release valve and through which the automatic system controls pressures in the vacuum train pipe, the valve being shown in application position.

Figure 3 is a fragmentary section similar to a portion of Figure 2 but showing the pilot valve in the position assumed during lap and release.

Figure 4 is a diagram indicating how the rotary valve of the engineer's brake valve is modified according to the preferred embodiment. Lap position is illustrated.

Figure 5 is a fragmentary view similar to a portion of Figure 2, showing the choke vent used in the modified embodiment.

Referring first to Figure 1 a conventional locomotive equipment will first be briefly described with the understanding that it conforms to standard American practice.

The main reservoir 6 is supplied with compressed air by a compressor (not shown) through the radiating pipe 7. The main air line 8 supplies air through a filter indicated by a legend, directly to the engineer's brake valve 9 which may be of a standard H—6 type, and also through a feed valve 11. Pipe 8 also supplies air to the independent brake valve 12 through the reducing valve 13. The main air pipe 8 also supplies air directly to the distributing valve 14.

The engineer's brake valve 9 has the usual equalizing reservoir 15.

The engineer's brake valve 9 is connected by the branch pipe 16 with the brake pipe 17. The usual double-heading cock 18 is interposed in the branch pipe 16. The brake pipe 17 is provided at both ends with angle cocks 19 and connecting hose 21.

The branch pipe 22 with cut-out cock 23 connects the brake pipe 17 with the distributing valve. The usual cut-out cock 24 is interposed between the distributing valve and the main reservoir pipe 8. The distributing valve is connected by the branch pipe 25 with the locomotive brake cylinders 26.

Other connections familiar in the art are indicated in the drawings and do not require detailed description since the layout conforms to standard practice.

Figure 1 also shows certain vacuum brake equipment which will now be described.

There is a so-called vacuum reservoir 27 which is connected to the usual exhauster (not shown). There is a vacuum train pipe 28 at each end of which are connecting hoses 29 which have the usual couplings as shown. When not in use these seal with the sealing brackets 31. This arrangement makes it unnecessary to use anything in the nature of an angle cock.

Interposed between the vacuum train pipe 28 and the locomotive equipment is a vacuum control valve indicated in Figure 1 by the numeral 32 applied to its body. This valve is illustrated in detail in Figures 2 and 3 and will be described hereafter.

There are the following connections which lead to the body 32 of the vacuum control valve: the main vacuum connection 33 which leads from the vacuum reservoir, the brake pipe connection 34 which leads from the brake pipe 17, the vacuum train pipe connection 35 which leads from the vacuum train pipe 28, and a connection 36 which leads from the governor port of the automatic brake valve 9.

The only brake cylinders on the locomotive are the brake cylinders 26. It will be understood that the vacuum train pipe 28 is intended to control vacuum brakes on connected cars just as the brake pipe 17 is intended to control automatic pressure brakes on connected cars. It follows that the locomotive can handle cars equipped with either system. It can even handle mixed equipment, that is some cars on the vacuum system and some cars on the pressure system, but in such case it is anticipated that the cars will be equipped each with a brake pipe and a vacuum train pipe with the necessary connecting hose and accessories.

Refer now to Figures 2 and 3. The vacuum control valve whose body is indicated at 32, and to which the connections 33 to 36 are made, carries two functionally independent valve mechanisms, a release valve mechanism for the vacuum system and an application valve mechanism for the vacuum system. The release valve functions to connect and disconnect the vacuum train pipe to and from the vacuum reservoir and is controlled directly by the automatic brake valve 9.

The release valve proper is a large capacity poppet valve 37 which is biased to closed position by a coil compression spring 38. The space above the valve is in free communication with vacuum train pipe 35. The space 39 below the valve is in free communication with the vacuum reservoir 27 by way of the pipe 33. This assumes that the vacuum system is in operation and that the cut-out cocks in pipes 33 and 35 indicated on Figure 1 are open.

Between the space 39 below the valve 37 and the motor chamber 41 within cap 42 is a flexible diaphragm motor comprising the combined diaphragm and gasket 30 and a thrust plate 40. The center of the diaphragm is fastened to the thrust plate and when the diaphragm is forced upward the thrust plate engages the valve 37 and unseats it, connecting the vacuum train pipe with the vacuum reservoir to establish release conditions for the vacuum system.

The chamber 41 below the diaphragm motor is connected by the pipe 36 with a governor port of the engineer's brake valve 9.

The brake valve has six functional positions. The first three of these, known as release, running and holding, require release of the train brakes, and the other three, known as lap, service and emergency, require application of the train brakes.

In release, running and holding the valve 37 should be open and connection between the governor port of the valve 9 and the chamber 41 secures this result because the engineer's brake valve puts the governor port under pressure in these three positions. The engineer's brake valve blanks the governor port normally in lap, service and emergency positions, so some means must be provided to vent the chamber 41 and allow the valve 37 to close when the brake valve is in lap, service or emergency position. There are two simple ways of securing this result.

Refer to Figure 4 which shows the preferred arrangement involving a modification of the rotary valve of the engineer's brake valve 9. Figure 4 shows an ordinary H—6 rotary valve and seat in diagram with the rotary valve in lap position. The seat ports are shown in broken line. Cavities in the lower face of the rotary valve are shown in light continuous line and ports which lead through from the top of the rotary valve are shown in heavy continuous line. The governor port in the seat is indicated at 43. The governor port in the rotary valve which is a through port is indicated at 44 and has a groove extension on the face of the rotary valve indicated at 45. The ports 44 and 45 are the means used to keep the port 43 under pressure in release, running and holding positions.

To vent the port 43 in lap, service and emergency positions an arcuate groove 46 is cut in the lower face of the rotary valve and provided with a radial extension 47 which leads to the center of the rotary and consequently to the exhaust passage of the engineer's brake valve. It follows that if the rotary valve is modified as indicated in Figure 4, the valve 37 will be open in release, running and holding positions and closed in lap, service and emergency positions.

If for any reason it is desired to avoid modification of the engineer's brake valve 9, a standard valve lacking the groove 46 and extension 47 may be used. In such case recourse is had to the arrangement shown in Figure 5 in which a small bleed port 48 is provided to vent the space 41. The capacity of this port is less than the rate at which air is supplied through the port 44 to the governor port 43 in release, running and holding positions. Consequently the port 48 is ineffective in these three positions but will vent the chamber 41 in lap, service and emergency positions when it is desired to permit the valve 37 to close.

The only objection to the construction shown in Figure 5 is that it is subject to some time lag and hence is inferior to the arrangement suggested in Figures 1 to 4 inclusive.

As has been stated, the vacuum control valve includes an application valve. This comprises a large capacity poppet valve 51 biased to close by a coil compression spring 52. The valve 51 operates to connect the vacuum train pipe 28 to atmosphere or to disconnect it therefrom. Consequently the branch connection 35 leads to the space 53 below the poppet valve 51 and the space above that valve is open to atmosphere.

Between the space 53 and the space 54 within the cap 55 is a combined diaphragm and gasket 56. This is attached at its center to the thrust plate 57 which unseats the valve 51 when the diaphragm moves upward. To control the pressure in the chamber 54 use is made of a pilot slide valve 58. This has a cavity 59 in its seated face. The valve functions to connect the space 54 to a source of pressure fluid such as the brake pipe (see Fig. 2) and alternatively to cut off this connection and connect the chamber 54 to atmosphere.

This can be done in various ways but in the embodiment illustrated the valve exposes the port 61 and thus connects it to the space 62 which is always at brake pipe pressure. This occurs when the valve 58 is in its lower position as shown in Figure 2. When the valve is in its upper position as shown in Figure 3, the cavity 59 connects the port 61 with an exhaust port 60.

To actuate the valve 58 use is made of a differential diaphragm mechanism which will now be described. The valve is confined in a notch in a longitudinally shiftable stem 63. The valve is held to its seat by a bow string clearly shown in the drawings. The stem 63 is connected to the centers of two spaced diaphragms, a small diaphragm 64, whose lower side is subject to the pressure in the chamber 62, and a larger diaphragm 65 whose lower face is subject to the pressure in the chamber 66 between the two diaphragms. The upper face of diaphragm 65 is subject to atmospheric pressure, admitted by port 67. The space 66 between the two diaphragms is in communication with the vacuum train pipe by way of a choke 68.

As clearly shown in the drawings the diaphragms are clamped at their centers to the stem 63 which is provided with thrust plates of familiar form. The entire diaphragm assembly is biased downward, that is toward the position of Figure 2 by a coil compression spring 69 which reacts between a spring seat 71 carried by the upper end of stem 63 and an adjustable spring seat 72 which is threaded in the cap 73. This cap confines the margin of the larger diaphragm 65. A check nut 74 is used to lock the spring seat 72 in its adjusted positions.

The areas of the two diaphragms 64 and 65 and the load on the spring 69 are so coordinated as to harmonize the applications produced by reductions of pressure in the brake pipe 17 and by the resulting increases of pressure in the vacuum train pipe 28. One satisfactory interrelation is such that when an absolute pressure of 5 lbs. per square inch is effective in the chamber 66, a brake pipe pressure of 70 lbs. gauge acting in chamber 62 will just overcome the stress exerted by spring 69. The above values are given on the assumption that the normal brake pipe pressure is 70 lbs. gauge. If the brake pipe pressure is reduced below 70 lbs., the spring 69 will move the valve to the application position shown in Figure 2. This results in opening of the valve 51 so that the pressure between diaphragm 64 and 65 will rise and move the valve 58 back to the position shown in Figure 3. It follows that pressure in vacuum train pipe will rise from its normal running pressure of 5 lbs. absolute as pressure in the brake pipe falls from its normal running pressure of 70 lbs. gauge. The values chosen are of course merely illustrative.

The invention allows a dominant automatic brake system to control the action of a servient vacuum brake system without requiring any material change in the construction or operation of the automatic pressure brake system. In the combined pressure and vacuum systems of the prior art so far as is known to applicant, the vacuum system has been the dominant system.

An important feature of the present invention is that the automatic pressure system is believed to be the better system and in any event is the system with which American engine drivers are familiar.

Under existing conditions switching engines operated by army personnel are sometimes connected with cars having automatic pressure brakes and at other times with cars having vacuum brakes. The invention affords the familiar type of control without regard to the type of brakes used on the cars attached to the particular locomotive.

While one embodiment of the invention and a slight modification thereof have been described in considerable detail, that embodiment should be regarded as illustrative and not limiting, the scope of the invention being defined only by the claims.

What is claimed is:

1. The combination of a normally charged brake pipe operating on the automatic principle; a normally evacuated train pipe operating on the vacuum principle; a normally closed application valve for admitting air to the vacuum train pipe; a pressure motor for opening said valve; and a coordinating valve for admitting pressure fluid to said motor in response to a brake pipe pressure reduction and then exhausting said motor in response to a rise of vacuum train pipe pressure comprising a valve having alternative admission and exhaust positions, two movable actuating abutments therefor on which respectively brake pipe and vacuum train pipe pressures act to move the valve toward exhaust position; and means for biasing said valve toward admission position.

2. The combination of a normally charged brake pipe operating on the automatic principle; a normally evacuated train pipe operating on the vacuum principle; a normally closed application valve for admitting air to the vacuum train pipe; a pressure motor for opening said valve; and a coordinating valve for admitting pressure fluid from the brake pipe to said motor in response to a brake pipe pressure reduction and then exhausting said motor in response to a rise of vacuum train pipe pressure comprising a valve having alternative admission and exhaust positions, two movable actuating abutments therefor on which respectively brake pipe and vacuum train pipe pressures act to move the valve toward exhaust position; and means including one of said abutments exposed to atmospheric pressure for biasing said valve toward admission position.

3. The combination of a normally charged brake pipe operating on the automatic principle; a normally evacuated train pipe operating on the vacuum principle; a normally closed application valve for admitting air to the vacuum train pipe; a pressure motor for opening said valve; and a coordinating valve for admitting pressure fluid to said motor in response to a brake pipe pressure reduction and then exhausting said motor in response to a rise of vacuum train pipe pressure comprising a valve having alternative admission and exhaust positions, two movable actuating abutments therefor on which respectively brake pipe and vacuum train pipe pressures act to move the valve toward exhaust position; means for biasing said valve toward admission position; and flow-restricting means for delaying the effect of changing vacuum train pipe pressure on the related abutment.

4. The combination of an automatic air brake system having a brake pipe and an engineer's brake valve for controlling the pressure therein; a vacuum brake system having a vacuum train pipe, evacuating means, a release valve operable to connect the vacuum train pipe with the evacuating means and an application valve operable to admit atmospheric air to the vacuum train pipe; pressure operated means controlled directly by the engineer's brake valve for operating the release valve; a pressure motor subject to pressures in the brake pipe and in the vacuum train pipe; and means whereby said motor serves to open the application valve upon a fall of brake pipe pressure and thereafter close it upon a corresponding rise of vacuum train pipe pressure.

5. The combination of an automatic air brake system having a brake pipe and an engineer's brake valve for controlling the pressure therein; a vacuum brake system having a vacuum train pipe, evacuating means, a release valve operable to connect the vacuum train pipe with the evacuating means and an application valve operable to admit atmospheric air to the vacuum train pipe; pressure operated means controlled directly by the engineer's brake valve for operating the release valve; a pressure motor subject to pressures in the brake pipe and in the vacuum train pipe; a pilot valve shiftable by said pressure motor; and an application motor controlled by said pilot valve and serving to control the opening and closing of the application valve.

6. The combination of a locomotive brake equipment including an automatic brake valve and a brake pipe; a vacuum train pipe; evacuating means; a pressure operated release valve for connecting the vacuum train pipe with the evacuating means, and alternatively interrupting such connection; means whereby said release valve is controlled directly by the engineer's brake valve; a pressure operated application valve for connecting the vacuum train pipe to atmosphere; a pilot valve for controlling said application valve; and means controlled jointly by brake pipe pressure and vacuum train pipe pressure and arranged to actuate the pilot valve.

7. The combination defined in claim 6 in which the pressure operated application valve and pressure operated release valve are each of the large-capacity poppet type and are spring biased in a closing direction and the operating means for each thereof comprises a single-acting movable abutment.

8. The combination of a locomotive brake equipment including an automatic brake valve having a governor port in which different pressures exist for release conditions and for application conditions and a brake pipe; a vacuum train pipe; evacuating means; a pressure operated release valve for connecting the vacuum train pipe with the evacuating means, and alternatively interrupting such connection; means whereby said release valve is subject to pressures existing in the governor port of the engineer's brake valve; a pressure operated application valve for connecting the vacuum train pipe to atmosphere; a pilot valve for controlling said application valve; and means controlled jointly by brake pipe pressure and vacuum train pipe pressure and arranged to actuate the pilot valve.

9. The combination of a locomotive brake equipment including an automatic brake valve and a brake pipe; a vacuum train pipe; evacuating means; a pressure operated release valve for connecting the vacuum train pipe with the evacuting means, and alternatively interrupting such connection; means whereby said release valve is controlled directly by the engineer's brake valve; a pressure operated application valve for connecting the vacuum train pipe to atmosphere; a shiftable admission and exhaust slide valve serving to control the operating pressure for said application valve; and a differential diaphragm mechanism controlled conjointly by brake pipe and vacuum train pipe pressures and arranged to shift said slide valve.

10. In a dual braking system, the combination of an automatic brake system comprising a normally charged brake pipe and an engineer's brake valve operable to control brake pipe pressure; a vacuum brake system including a normally evacuated train pipe; a self-lapping valve for admitting air to the vacuum train pipe comprising valve opening means responsive to a fall of brake pipe pressure and valve closing means responsive to a rise of vacuum train pipe pressure; and means controlled by the engineer's brake valve for evacuating the vacuum brake pipe when the brake valve functions to charge the brake pipe.

11. The combination of an automaic air brake system including a normally charged brake pipe; a vacuum brake system including a normally evacuated train pipe; an engineer's brake valve arranged to afford charging of the brake pipe and evacuation of the train pipe under release and running conditions only, and reduction of brake pipe pressure under application conditions; and means responsive to reductions of brake pipe pressure to cause related increases of vacuum train pipe pressure.

HENRY NORTON SUDDUTH.